United States Patent [19]

Gödel

[11] Patent Number: 5,506,376
[45] Date of Patent: Apr. 9, 1996

[54] APPARATUS FOR ABSORBING VIBRATIONS IN AN EXHAUST SYSTEM OF A VEHICLE

[75] Inventor: Frank-Uwe Gödel, Stutensee, Germany

[73] Assignee: IWK Regler und Kompensatoren GmbH, Stutensee, Germany

[21] Appl. No.: 246,615

[22] Filed: May 20, 1994

[30] Foreign Application Priority Data

Jun. 2, 1993 [DE] Germany .......................... 43 18 343.3

[51] Int. Cl.⁶ .............................. F16F 15/00; F16L 27/00
[52] U.S. Cl. ............................................. 181/208; 285/227
[58] Field of Search ..................................... 181/207, 208, 181/209, 228; 285/49, 163, 164, 226, 227, 228, 299, 300

[56] References Cited

U.S. PATENT DOCUMENTS

| | | | |
|---|---|---|---|
| 4,659,117 | 4/1987 | Holzhausen et al. ..................... 285/49 |
| 4,875,716 | 10/1989 | Winzen et al. ..................... 285/226 X |
| 5,090,746 | 2/1992 | Holzhausen ............................. 285/226 |
| 5,145,215 | 9/1992 | Udell ........................................ 285/49 |
| 5,358,287 | 10/1994 | Winzen .................................. 285/227 |

*Primary Examiner*—Khanh Dang
*Attorney, Agent, or Firm*—Antonelli, Terry, Stout & Kraus

[57] ABSTRACT

The invention proposes an apparatus for damping or absorbing vibrations in an exhaust system of a vehicle, having two connection ends, at least one bellows and absorbing cushions, in which bellows are arranged on either side of said cushions. This leads to a better standardization, adaptability and design of such an apparatus and in particular in the case of the same angular movement the two bellows are less stressed or greater angular movements are possible.

22 Claims, 1 Drawing Sheet

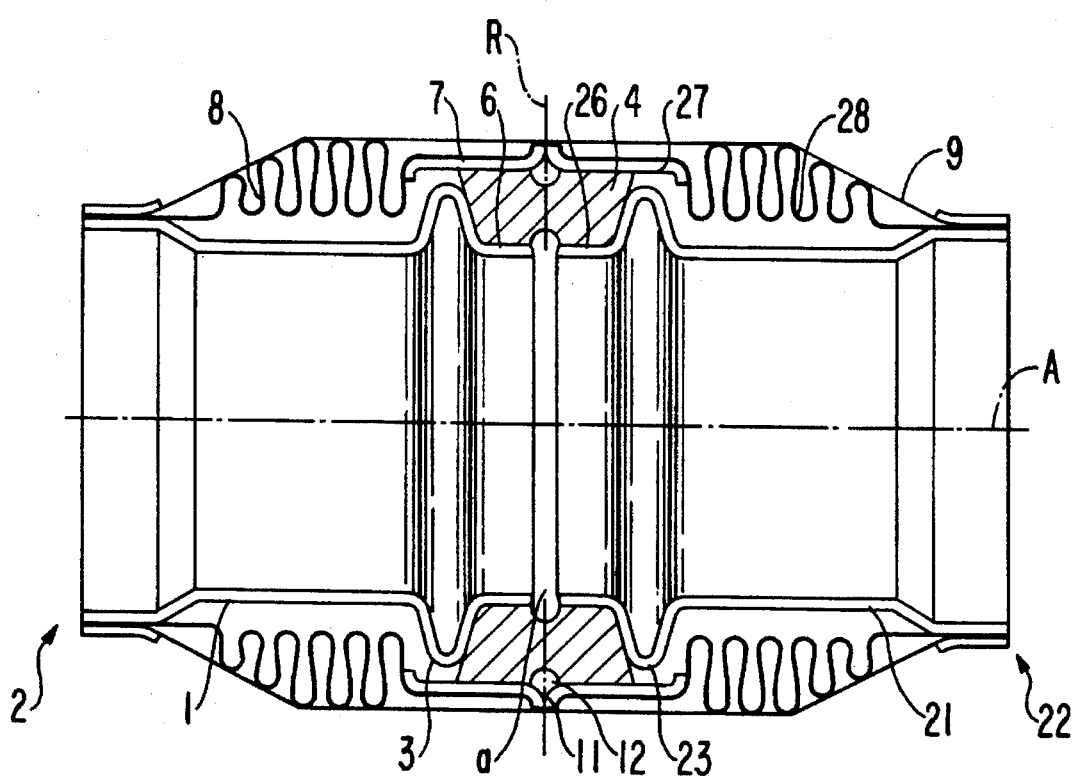

APPARATUS FOR ABSORBING VIBRATIONS IN AN EXHAUST SYSTEM OF A VEHICLE

BACKGROUND OF THE INVENTION

The invention relates to an apparatus for damping or absorbing vibrations in an exhaust system of a vehicle, having two connection ends, at least one bellows and damping or absorbing cushions.

FIELD OF THE INVENTION

Such apparatuses for absorbing vibrations in exhaust systems of vehicles, particularly motor vehicles, serve more particularly for the decoupling of the vibrating movement of the engine with respect to the remaining exhaust system of the vehicle, namely exhaust pipes, catalyzers, silencers or mufflers and the like. Such apparatuses for absorbing such mechanical vibrations are known in numerous different designs.

SUMMARY OF THE INVENTION

The main objective of the invention is to provide a novel apparatus, which permits a better design and adaptation to desired conditions.

According to the invention this objective is achieved in the case of an apparatus of the aforementioned type, in that bellows are located on either side of at least one absorbing cushion.

As a result of the apparatus according to the invention, for a given angular mobility there is a reduced loading of each individual bellows or alternatively a greater angular mobility can be obtained. Both the aforementioned advantages are in particular assisted if the overall arrangement is constructed symmetrically to a radial center plane.

According to a preferred embodiment, abutments are provided which one connection end connected to absorbing cushions and the abutments are in particular formed by deflections or outward bends on guide pipes. In this case the connection ends can be constructed in one piece on the guide pipes or, if constructed separately therefrom, are joined thereto in a conventional manner.

If between the abutments connected to one pipe end there are only cushions which are intended to absorb compressive forces pressing the pipes against one another, then the pipe ends are elastically braced against one anther for absorbing tensile forces. The elastic bracing can be implemented in numerous different ways. According to a particularly preferred development the pipe ends are braced against one another by means of a flexible braided or knitted metal sleeve, which externally surrounds the other members, namely guide pipes, absorbing cushions and bellows and therefore protects them against damage.

According to another preferred development, the damping or absorbing cushions are externally surrounded by ring parts, so that the cushions are radially and outwardly surrounded by a casing. Both in the area where the absorbing cushions are exposed to the gas flow, namely where the guide pipes face one another, but more particularly also in areas where other structural elements, such as in particular the ring parts forming the outer casing are welded together, i.e. welds are provided, according to a preferred development the absorbing cushions are provided in the vicinity of the welds of structural parts of the apparatus with recesses. This essentially prevents damage by the heat occurring during welding to the absorbing cushion, which is made from compressed metal wire, either as a random laid layer, knitted fabric or the like, or the influences of the gas flow on the absorbing cushion are reduced.

According to another development the cushions are constructed as segment cushions and in particular the cushions are held by abutments having a radial extension component. Alternatively the cushions engage on one another with their end faces with a radial extension component or complete ring cushions are introduced in the circumferential direction.

While a cushion can be provided in the axial direction, alternatively several individual cushions are juxtaposed in the axial direction.

As a result of the flexible braided/knitted metal sleeve, axial tensile forces on the pipe ends and to a certain extent shear, torsional and angular movements are absorbed. Compressive forces on the pipe ends are absorbed by abutments engaging on the cushion. To the extent that the guide pipes are drawn into the cushions, then this construction helps to absorb shear forces and, together with the outer casing ring, also angular forces. In the case of segment cushions with frontal abutments having a radial extension component, they are also able to absorb torsional movements.

According to a further preferred development, several cushions are radially superimposed. As a result, the outer cushion layers are thermally insulated and therefore protected with respect to the hot gas stream passing through the arrangement.

BRIEF DESCRIPTION OF THE DRAWING

Further advantages and features of the invention can be gathered from the following description of a preferred embodiment of the invention with reference to the single drawing, which represents a preferred embodiment of the apparatus according to the invention in longitudinal section.

DESCRIPTION OF THE PREFERRED EMBODIMENTS

The apparatus for damping or absorbing vibrations of the exhaust system of a vehicle according to the invention has, in the represented embodiment, two guide pipes 1, 21 having an axial relative spacing a with respect to one another and which in each case have remote connection ends 2, 22 for connecting to the vehicle engine or to the further exhaust system thereof. In their facing areas the guide pipes 1, 21 are provided with abutments 3, 23 in the form of radial individual waves or outward stampings for damping or absorbing cushions 4. Whereas in the represented embodiment there are one-piece absorbing cushions 4 in the axial direction, several such cushions can be axially arranged in succeeding manner, i.e. there can be several axial absorbing cushion layers. In the circumferential direction the absorbing cushions can be constructed in one piece as a ring or as abutting cushion segments. In addition, several absorbing cushions can be arranged circumferentially and in spaced manner about the longitudinal axis A and they are then held circumferentially against sliding by abutments extending outwards with a radial component from the inner ends 6, 26 of the guide pipes 1, 21 and are optionally also pretensioned in this direction.

If, as in the represented embodiment, the absorbing cushions 4 are externally embraced by a ring constituted by ring parts 7, 27, then on the latter can be secured the abutments for fixing the absorbing cushions 4 against circumferential sliding. Outside the guide pipes 1, 21 bellows 8, 28 extend from their connection ends 2, 22 to over and beyond the ring parts 7, 27.

A flexible braided or knitted metal sleeve 9 extends over the bellows 8, 28 and the ring parts 7, 27 from one connection 2 to the other connection end 22 and by means of which the two guide pipes 1, 21 and between them or more precisely between the abutments 3, 23 formed thereon, the absorbing cushions 4 are axially braced.

In the area where the ring parts 7, 27 have welds 11, the absorbing cushions 4 have a drawn-in portion 12. The overall arrangement is precisely symmetrical to a radial plane R.

If the arrangement at the connection ends 2, 22 is tensile stressed, then said forces are absorbed by the flexible braided metal sleeve 9. If the arrangement is compressively stressed from the connection ends 2, 22, then these forces are absorbed by the absorbing cushions 4 by means of the abutments 3, 23. As a result of the absorbing cushions being surrounded by the ring parts 7, 27, it is also possible to absorb shear, angular and radial forces. If the absorbing cushions are not completely ring symmetrical and instead individual absorbing cushion segments are provided, which are circumferentially held by means of abutments, either at the ends 6, 26 of the guide pipes 1, 21 or the ring parts 7, 27, then also torsional forces can be absorbed by the apparatus according to the invention.

I claim:

1. An apparatus for absorbing vibrations in an exhaust system having first and second connection ends comprising:

first and second axially aligned pipes having first ends which are spaced apart and joined together by at least one annular absorbing cushion which contacts an outside surface of the first and second axially aligned pipes adjacent to the first ends and second ends which respectively are the first and second connection ends;

a first bellows disposed between the first connection end and the at least one annular absorbing cushion; and a second bellows disposed between the second connection end and the at least one annular absorbing connection.

2. An apparatus in accordance with claim 1 further comprising:

a first abutment projecting radially outward from a section of the first pipe spaced from the first end thereof with the first abutment contacting the at least one annular absorbing cushion; and a second abutment second pipe projecting radially outward from a section of the second pipe spaced from the second end thereof with the second abutment contacting the at least one annular cushion.

3. An apparatus in accordance with claim 1 further comprising:

at least one ring part, contacting an outer peripheral portion of the at least one annular absorbing cushion, joined to a first end of the first bellows and to a first end of the second bellows with a second end of the first bellows joined to the first pipe and a second end of the second bellows joined to the second pipe.

4. An apparatus in accordance with claim 2 further comprising:

at least one ring part, contacting an outer peripheral portion of the at least one annular absorbing cushion, joined to a first end of the first bellows and to a first end of the second bellows with a second end of the first bellows joined to the first pipe and a second end of the second bellows joined to the second pipe.

5. An apparatus in accordance with claim 1 further comprising:

a flexible metal sleeve having a first end connected to the first pipe and a second end connected to the second pipe and having an inner surface contacting the first and second bellows.

6. An apparatus in accordance with claim 2 further comprising:

a flexible metal sleeve having a first end connected to the first pipe and a second end connected to the second pipe and having an inner surface contacting the first and second bellows.

7. An apparatus in accordance with claim 3 further comprising:

a flexible metal sleeve having a first end connected to the first pipe and a second end connected to the second pipe and having an inner surface contacting the first and second bellows and the at least one ring part.

8. An apparatus in accordance with claim 4 further comprising:

a flexible metal sleeve having a first end connected to the first pipe and a second end connected to the second pipe and having an inner surface contacting the first and second bellows and the at least one ring part.

9. An apparatus in accordance with claim 5 wherein the flexible metal sleeve comprises:

a knitted sleeve.

10. An apparatus in accordance with claim 5 wherein the flexible metal sleeve comprises:

a braided sleeve.

11. An apparatus in accordance with claim 6 wherein the flexible metal sleeve comprises:

a knitted sleeve.

12. An apparatus in accordance with claim 6 wherein the flexible metal sleeve comprises:

a braided sleeve.

13. An apparatus in accordance with claim 7 wherein the flexible metal sleeve comprises:

a knitted sleeve.

14. An apparatus in accordance with claim 7 wherein the flexible metal sleeve comprises:

a braided sleeve.

15. An apparatus in accordance with claim 8 wherein the flexible metal sleeve comprises:

a knitted sleeve.

16. An apparatus in accordance with claim 8 wherein the flexible metal sleeve comprises:

a braided sleeve.

17. An apparatus in accordance with claim 2 wherein:

the first abutment is formed in the first pipe and a face on a first end of the at least one annular absorbing cushion contacts the first abutment on a portion of the first abutment which projects radially outward; and the second abutment is formed in the second pipe and a face on a second end of the at least one annular absorbing cushion contacts the second abutment on a portion of the second abutment which projects radially outward.

18. An apparatus in accordance with claim 4 wherein:

the first abutment is formed in the first pipe and a face on a first end of the at least one annular absorbing cushion contacts the first abutment on a portion of the first abutment which projects radially outward; and the second abutment is formed in the second pipe and a face on a second end of the at least one annular absorbing cushion contacts the second abutment on a portion of the second abutment which projects radially outward.

19. An apparatus in accordance with claim 6 wherein:

the first abutment is formed in the first pipe and a face on a first end of the at least one annular absorbing cushion contacts the first abutment on a portion of the first abutment which projects radially outward; and the second abutment is formed in the second pipe and a face on a second end of the at least one annular absorbing cushion contacts the second abutment on a portion of the second abutment which projects radially outward.

20. An apparatus in accordance with claim 11 wherein:

the first abutment is formed in the first pipe and a face on a first end of the at least one annular absorbing cushion contacts the first abutment on a portion of the first abutment which projects radially outward; and the second abutment is formed in the second pipe and a face on a second end of the at least one annular absorbing cushion contacts the second abutment on a portion of the second abutment which projects radially outward.

21. An apparatus in accordance with claim 12 wherein:

the first abutment is formed in the first pipe and a face on a first end of the at least one annular absorbing cushion contacts the first abutment on a portion of the first abutment which projects radially outward; and the second abutment is formed in the second pipe and a face on a second end of the at least one annular absorbing cushion contacts the second abutment on a portion of the second abutment which projects radially outward.

22. An apparatus in accordance with claim 3 further comprising:

a pair of ring parts which are joined together with a weld radially aligned with a space between the first and second pipes; and an annular space disposed in an outer cylindrical surface of the annular absorbing cushion facing the weld.

\* \* \* \* \*